United States Patent [19]
Tacklind et al.

[11] Patent Number: 5,510,940
[45] Date of Patent: Apr. 23, 1996

[54] BALL SPINDLE FOR REDUCED FRICTION ROTARY ACTUATOR IN DISK DRIVE

[75] Inventors: Thomas A. Tacklind, San Martin; William G. Moon, Saratoga, both of Calif.

[73] Assignee: Quantum Corporation, Milpitas, Calif.

[21] Appl. No.: 339,584

[22] Filed: Nov. 14, 1994

Related U.S. Application Data

[63] Continuation-in-part of Ser. No. 979,974, Nov. 23, 1992, abandoned.

[51] Int. Cl.$^6$ .............................. G11B 5/54; F16C 19/50
[52] U.S. Cl. ............................................ 360/106; 384/610
[58] Field of Search .................................. 384/461, 490, 384/610; 360/104, 106, 105, 97.01, 97–99.12

[56] References Cited

U.S. PATENT DOCUMENTS

| | | | |
|---|---|---|---|
| 1,121,087 | 12/1914 | Golly | 384/461 |
| 3,610,714 | 10/1971 | DeGaeta | 384/610 |
| 3,731,985 | 5/1973 | De Gaeta | 308/194 |
| 3,766,548 | 10/1973 | Abel | 340/373 R |
| 4,116,500 | 9/1978 | Hüber | 384/490 |
| 4,326,759 | 4/1982 | Rasmus | 384/461 |
| 4,367,546 | 1/1983 | Shibata | 369/271 |
| 4,856,918 | 8/1989 | Inoue et al. | 384/610 |
| 5,328,271 | 7/1994 | Titcomb | 384/610 |

FOREIGN PATENT DOCUMENTS

| | | | |
|---|---|---|---|
| 0028555 | 10/1921 | Denmark | 384/461 |
| 1148571 | 12/1957 | France | 384/461 |
| 55-150163 | 11/1980 | Japan . | |
| 58-023322 | 4/1983 | Japan . | |
| 62-098021 | 5/1987 | Japan . | |
| 2046572 | 2/1990 | Japan . | |

OTHER PUBLICATIONS

Paul Baillio, "Jewel Bearings Solve Light Load Problems," *Machine Design*, Oct. 26, 1989 pp. 111–114.

NSK Datasheet for BCF Style Bearing Assemblies (undated).

*Primary Examiner*—John H. Wolff
*Assistant Examiner*—Brian E. Miller
*Attorney, Agent, or Firm*—David B. Harrison

[57] ABSTRACT

A low friction bearing is provided for a mass balanced rotary voice coil actuator of a disk drive including a base. The bearing comprises an upper pivot bearing assembly fixed to one of the actuator and the base and including a plurality of small bearing balls in an outer bearing race thereof, a lower pivot bearing assembly fixed to the same one of the actuator and the base and including a plurality of small bearing balls in an outer bearing race thereof, an upper main bearing ball for engaging the other of the actuator and the base and for making rolling contact against the plurality of small bearing balls of the upper pivot bearing assembly, and a lower main bearing ball for engaging the same other of the actuator and the base and for making rolling contact against the plurality of small bearing balls of the lower pivot bearing assembly.

17 Claims, 4 Drawing Sheets

BALL SPINDLE FOR REDUCED FRICTION ROTARY ACTUATOR IN DISK DRIVE

REFERENCE TO RELATED APPLICATION

This is a continuation-in-part of U.S. patent application Ser. No. 07/979,974 filed on Nov. 23, 1992, now abandoned.

FIELD OF THE INVENTION

The present invention relates to disk drive actuators. More particularly, the present invention relates to a disk drive rotary voice coil actuator employing a low-friction ball spindle pivot.

BACKGROUND OF THE INVENTION

Rotary voice coil actuators in disk drives typically employ upper and lower ball bearing assemblies 12 and 14, as shown in FIG. 1. Such assemblies are relatively low cost, and have experienced widespread usage. They manifest a frictional torque in accordance with the ball friction multiplied by a radius R extending from the center of rotation of an actuator shaft 16 to approximately the center of rotation of a nominal rotating ball 18 of the bearing assembly.

As disk drive actuator assemblies become smaller, the ratio of friction (both static and dynamic) to actuator inertia increases to the point where it becomes difficult for the actuator head position servo system to cause small displacements needed for single track seeking and in order to follow accurately a data storage track centerline. As concentric track densities (i.e. "tracks per inch" or "TPI") increase, motions of ever decreasing magnitude are required in order to carry out small distance seeks, and to maintain desired head position over the track.

Undesirable low frequency resonance incident to small motions of the ball bearings in actuators is attributable to distortions of the ball which result in a high stiffness (K) with very low damping ($\eta$). During small motions, the actuator ball responds to an applied force by deforming elastically. The driving force is increased until the ball starts to roll and motion is realized. Unfortunately, by the time that the ball is driven out of its elastic deformation state and into rotary movement, excessive driving current has been applied, and the data transducer head is significantly mispositioned with respect to the desired corrected position. Initial deformation of the bearing ball results in high starting (i.e., static) friction ("stiction") and suggests that alternative bearing arrangements need to be considered.

Jewel bearings are known to provide a low friction coefficient at low frequencies, and have been employed in a wide variety of light load applications, particularly in clocks, watches, compasses, meter movements, etc. A variety of jewel bearing designs and applications are described in an article by Paul Baillio entitled "Jewel Bearings Solve Light Load Problems" in *Machine Design*, Oct. 26, 1989, pages 111–114. This article describes a technique of mounting a ball on the end of a shaft as one way to achieve higher thrust loads against a bearing jewel.

Pivot ball bearings are also known. Such cylindrical ball bearing assemblies comprise an outer, annular, fixed ball bearing race in which a plurality of highly polished steel balls are positioned. A cone-shaped pivot is loaded against the balls and thereupon defines an inner race. Pivot bearings of type BCF made by NSK, Japan, are available in a range of outer diameters of 3 mm to 16 mm, and define inner openings for cone pivots in a corresponding range of diameters of 0.81 mm to 8.11 mm. There are a number of drawbacks associated forming cones on actuator shafts including the costs associated with precision machining required, as well as surface smoothness and hardness of the machined cone bearing surface.

Despite the availability for many years of jewel bearings, and more recently of pivot ball bearing assemblies for use with pivot cones, a hitherto unsolved need has arisen for a reduced friction rotary actuator for a disk drive.

SUMMARY OF THE INVENTION WITH OBJECTS

An object of the present invention is to provide an improved rotary actuator bearing for a disk drive in a manner which overcomes limitations and drawbacks of the prior art.

Another object of the present invention is to provide a low friction, non-resonant at low frequency bearing assembly for a low power rotary actuator of a disk drive formed of low cost, readily available bearing components.

A further object of the present invention is to provide a disk drive rotary actuator bearing configuration with a reduced frictional torque.

One more object of the present invention is to combine low cost ball bearing components into a rotary actuator bearing assembly for a small diameter storage disk of a micro-Winchester disk drive in a manner reducing friction and overcoming low frequency resonances, for example.

In accordance with principles and aspects of the present invention, a low friction bearing is provided for a mass balanced rotary voice coil actuator of a disk drive including a base. The bearing comprises an upper pivot bearing assembly fixed to one of the actuator and the base and including a plurality of small bearing balls in an outer bearing race thereof, a lower pivot bearing assembly fixed to the same one of the actuator and the base and including a plurality of small bearing balls in an outer bearing race thereof, an upper main bearing ball for engaging the other of the actuator and the base and for making rolling contact against the plurality of small bearing balls of the upper pivot bearing assembly, and a lower main bearing ball for engaging the same other of the actuator and the base and for making rolling contact against the plurality of small bearing balls of the lower pivot bearing assembly.

In one aspect of the present invention, a diameter of a main bearing ball is approximately two times a diameter of a small bearing ball.

In another aspect of the invention, a locus line is formed between a center of a main bearing ball and a small bearing ball in contact with the main ball. The locus line forms an acute angle with an axis of rotation of the voice coil actuator of greater than 60 degrees and less than 85 degrees. Even more preferably, the angle is approximately 74 degrees.

In a further aspect of the invention, the bearing assemblies are mounted to the actuator and a supporting structure is fixed to the base for supporting the actuator, the supporting structure defining sockets for receiving the upper main bearing ball and the lower main bearing ball. Preferably, the supporting structure comprises a generally U-shaped structure having legs and a main body portion, and the legs define said sockets as cylindrical bores therethrough in alignment with an axis of rotation of the rotary actuator.

In one more aspect of the present invention the bearing assemblies are mounted to a structural support fixed to the drive's base.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Figure 1:
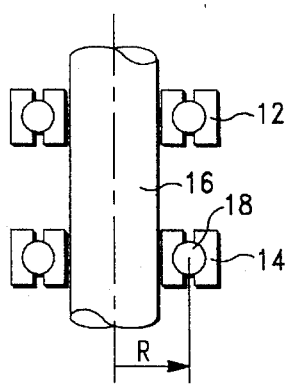
FIG. 1 is a diagrammatic view in section and elevation of a conventional rotary voice coil actuator pivot incorporating conventional ball bearing assemblies.
Figure 2:
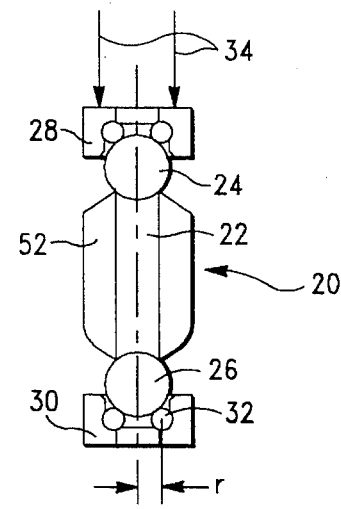
FIG. 2 is a diagrammatic view in section and elevation of a rotary voice coil actuator low friction ball-ball bearing pivot in accordance with principles of the present invention.

FIG. 2 provides a generalization of aspects of the present invention. Therein, a rotary voice coil actuator 20 includes a solid body portion 52 of the actuator which includes a cylindrical void 22 which defines cylindrical recesses at each end thereof. Two bearing balls 24 and 26 are seated in the cylindrical recesses. Significantly, this configuration eliminates the need for the precision machined spindle shaft typically required in prior art actuator pivot implementations, which also reduces the rotational inertia of actuator 20. The bearing balls 24 and 26 respectively engage two pivot ball bearing assemblies 28 and 30 which include much smaller bearing balls 32. In this example, a radius (r) between a central axis of rotation of solid body portion 52 and a point of rotation of one of the ball bearings 32 is significantly less than the radius (R) of the FIG. 1 example (assuming, for example, that the diameters of pin 16 and ball 24 are approximately equal). Since the radius (r) is much smaller than the radius (R), the frictional torque will be reduced by the same ratio or proportion between (r) and (R), and a highly efficient and effective, low friction actuator is realized. (The arrows noted by the lead line 34 denote standard preload force being applied against the bearings 28 and 30 in FIG. 2).

Figure 3:
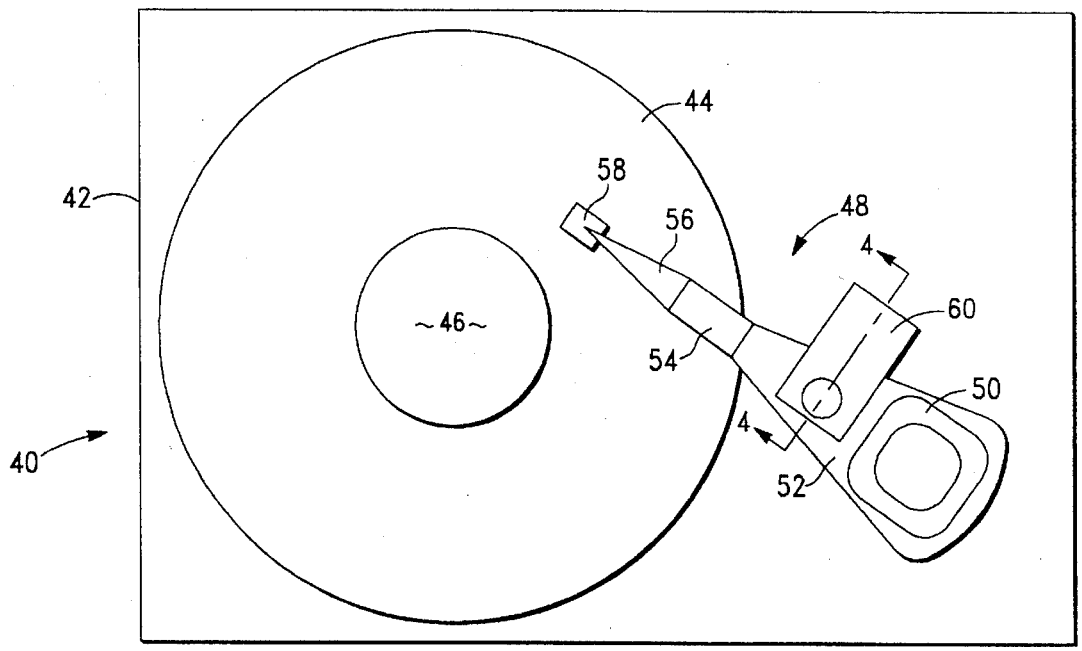
FIG. 3 is a greatly enlarged and diagrammatic plan view of a disk drive head and disk assembly employing the FIG. 2 pivot assembly.

FIG. 3 depicts a head and disk assembly 40 of a micro-Winchester disk drive in which a data storage head "flies" on an air bearing formed at the surface of a rotating data storage disk. The assembly 40 includes a suitably formed aluminum alloy base 42, a rotating data storage disk 44 which is mounted to a spindle 46 conventionally containing an in-hub spindle motor (not shown). Ideally, although not necessarily, the data storage disk is small, such as 2.5 inches or smaller, such as 1.8 inches or 1.3 inches.

A rotary voice coil actuator assembly 48 includes a flat voice coil 50 which moves within a high intensity magnetic gap formed by a fixed permanent magnet assembly (not shown) such that current applied in one direction of the coil 50 causes clockwise movement of the actuator 48, and reverse current causes counter-clockwise movement thereof.

The coil 50 is a part of a solid body portion 52 of the actuator, also referred to as an E-block (for reasons discussed hereinafter). A head arm 54 extends from the body portion 52 and supports a load beam 56 which preloads a head slider 58 toward the storage surface of the disk 44. A minute read/write head is formed conventionally at one slider rail of the slider 58 and writes data to, and reads data from, concentric data tracks formed on the storage surface of the disk 44. The disk 44 may be a very flat aluminum alloy, or glass substrate, sputter coated with a suitable thin film magnetic storage media, for example.

Figure 4A:
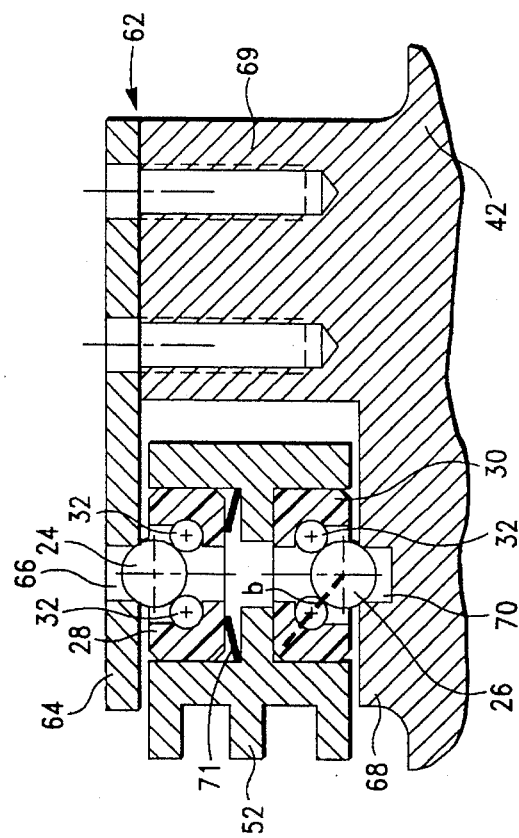
FIG. 4A is an enlarged view in elevation and section of the FIG. 3 rotary actuator, taken along dashed section line 4—4 in FIG. 3.

In accordance with principles of the present invention, an actuator pivot assembly 60 is provided for pivoting the actuator 48 to the base 42. As shown in FIG. 4A, the assembly 60 includes a generally U-shaped support block 62 having a top plate 64, a bottom plate 68, and an end block 69. The parts of U-block 62 may be fabricated discretely or as partially or fully joined subunits. The subunits may be attached together in any suitable manner to form the U-block 62 during assembly of the actuator pivot assembly 60, and in a preferred embodiment, bottom plate 68 and end block 69 are formed as a single integral subunit of U-block 62. The top plate 64 defines a cylindrical opening 66 sized to be smaller than a diameter of the upper main bearing ball 24, thereby forming a seat for the ball 24. The bottom plate 68 defines a similar cylindrical opening 70 forming a seat for the lower main bearing ball 26. Bottom plate 68 is preferably formed as an integral part of base 42 for improved rigidity and alignment accuracy, but may optionally be formed as a discrete unit and subsequently attached to base 42. In this example, the main body portion 52 of the actuator structure 48 defines a central transverse bore into which the two bearing assemblies 28 and 30 are secured. A suitable preload spring 71 applies an appropriate preload force against the bearing assemblies 28 and 30 and causes them to bear against the main bearing balls 24 and 26, respectively. Alternatively, top plate 64 may be employed as a cantilevered spring arm to apply a preload force.

The main bearing balls 24 and 26 are sized such that a locus line b extending from a center point of each main ball 24, 26 to a center of rotation of a pivot bearing assembly ball 32 forms a desired angle with a main axis of rotation a of the actuator 48. The particular angle will determine axial stiffness versus lateral stiffness of the actuator assembly. As the angle approaches zero degrees, axial stiffness approaches maximum while lateral stiffness approaches zero. On the other hand, as the angle approaches 90 degrees (zero degrees with respect to the major plane of the base 42) axial stiffness disappears while lateral stiffness approaches a maximum. Since lateral stiffness is needed to prevent tilt in the actuator structure, an angle in the range of greater than 60 degrees and less than 85 degrees, inclusive, and preferably of approximately 74 degrees (16 degrees with respect to the base plane) is presently preferred. More generally, the preferred angle lies in a range of greater than 60 degrees and less than 85 degrees.

Figure 4B:
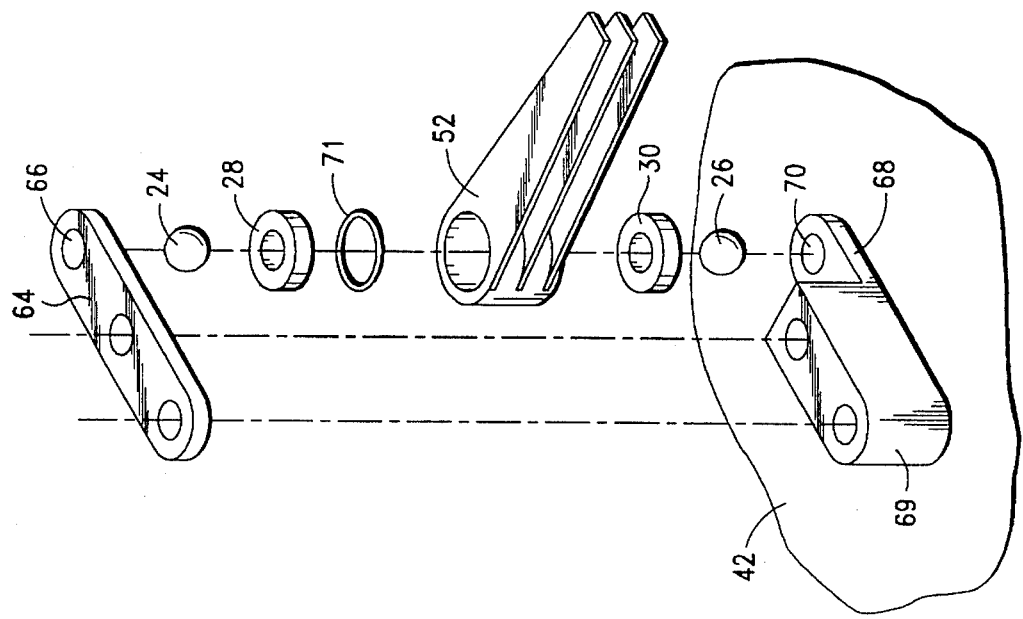
FIG. 4B is a diagrammatic, isometric, exploded view of the ball-bearing pivot assembly of FIG. 4A.

Pivot assembly 60 may be assembled as shown in FIG. 4B. Preload spring 71 is inserted into the central transverse bore of main body portion 52 of the actuator structure (certain structures, such as coil 50, have been deleted for clarity of illustration, although such structures may in be attached prior to this stage of assembly). In a preferred embodiment of the invention, main body portion 52 is fabricated as a single-piece, unitary structure. Main body portion 52 is also referred to as an E-block because when the body portion is viewed from a side section view, it resembles the capital letter E. Accordingly, any references to "E-block 52" contained herein should be understood as being equivalent to references to "body portion 52." E-block 52 is improved over prior art implementations because it obviates the prior art requirement for fabricating, assembling, and attaching a shaft for rotation about the E-block's rotational axis. Additionally, E-block 52 has less inertia than prior art E-blocks due to the removal of material along the rotational axis or U-block 52. Top and bottom beating assemblies 28 and 30, respectively, are inserted in the central transverse bore of E-block 52. This subassembly is positioned adjacent lower main bearing ball 26, which is positioned upon cylindrical opening 70 of bottom plate 68, which is formed as an integral part of base 42 along with end block 69. Upper main bearing ball 24 is positioned over the central transverse bore of E-block 52 and under cylindrical opening 66 of top plate 64. Top plate 64 is attached via screws (not shown) or other suitable means to end block 69 to complete the actuator pivot assembly.

Figure 5A:
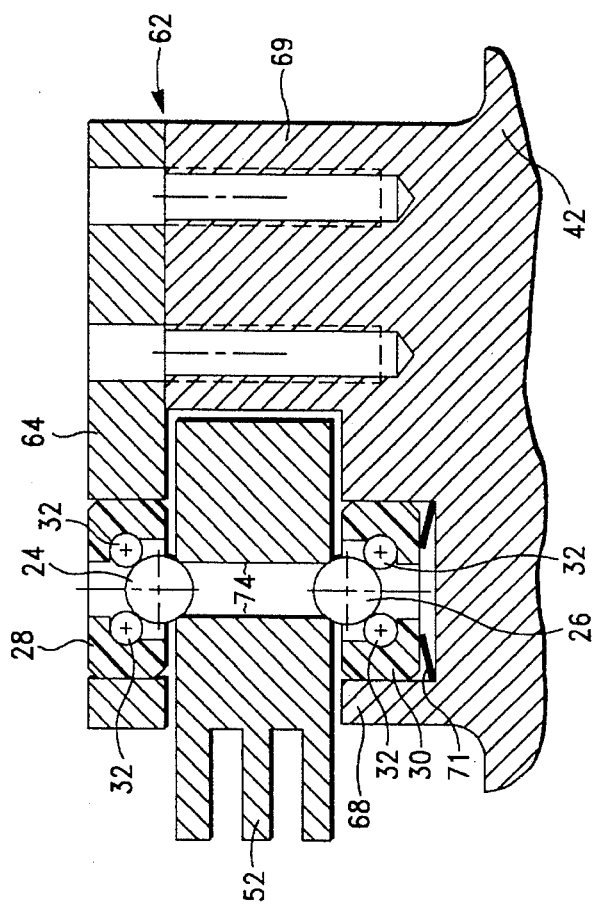
FIG. 5A is an enlarged view in elevation and section of an alternative ball-ball bearing pivot for a rotary voice coil actuator in accordance with principles of the present invention.

FIG. 5 illustrates an alternative preferred embodiment of the present invention. In the FIG. 5 illustration the same elements have the same reference numbers as are provided in the FIGS. 2, 3 and 4 example. As shown in FIG. 5A, the main body portion 52 of the actuator defines a central cylindrical opening 74 forming at each end thereof a seat for the main balls 24 and 26. The pivot bearing assemblies 28 and 30 are inverted from the positions shown in FIG. 4, and now face the balls 24 and 26 as in the FIG. 2 overview. A suitable mounting structure, U-block 62 is provided for mounting the pivot bearing assemblies 28 and 30 to the base 42 of the disk drive HDA 40. In this example, static preload force is applied via preload spring 71, however, preload spring 71 can be omitted and the static preload force may be applied from above and below the bearing assemblies 24 and 26 as a suitable anaerobic adhesive sets, locking the bearing assemblies in place against the main bearing balls 24 and 26. One drawback of the FIG. 5 approach in comparison with the FIG. 4 approach is that the main bearing balls 24 and 26 in FIG. 5 are closer together than they are in FIG. 4, thereby tending to reduce lateral stiffness.

Figure 5B:
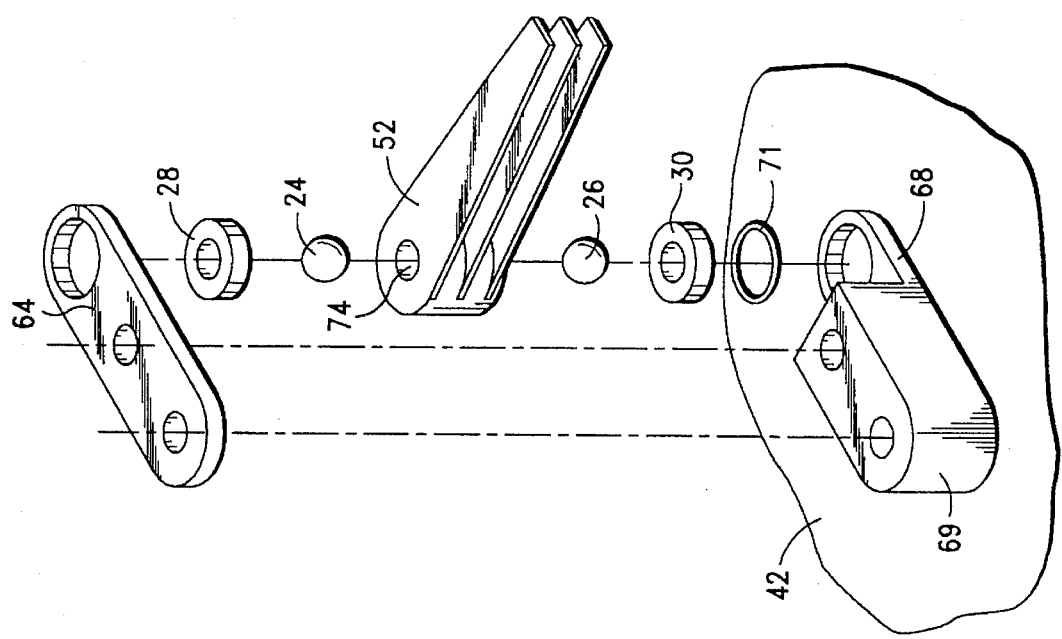
FIG. 5B is a diagrammatic, isometric, exploded view of the alternative ball-bearing pivot assembly of FIG. 5A.

FIG. 5B shows an simplified, diagrammatic, exploded view of the actuator pivot assembly illustrated in FIG. 5A. The preload spring 71 and lower pivot beating assembly 30 are inserted into the cylindrical recess in bottom plate 68. Lower main bearing ball 26 is positioned against lower pivot bearing assembly 30 and the lower opening of central cylindrical opening 74 of E-block 52 (certain structures, such as coil 50, have been deleted for clarity of illustration) is positioned against lower main bearing ball 26. The assembly procedure may be completed in a manner analogous to that discussed in connection with FIG. 4B, or alternatively, top plate 64 may optionally be attached to end block 69 at this point. In this latter assembly method, upper main bearing ball 24 may then be inserted through the opening in top plate 64 to engage the top opening of central cylindrical opening 74. Upper pivot bearing assembly 28 is inserted into the opening in top plate 64 to engage upper main bearing ball 24 and may be held in place by any suitable means, e.g., with an anaerobic adhesive. It should be apparent, that U-block 62 may be of unitary or articulated construction.

Figure 6:
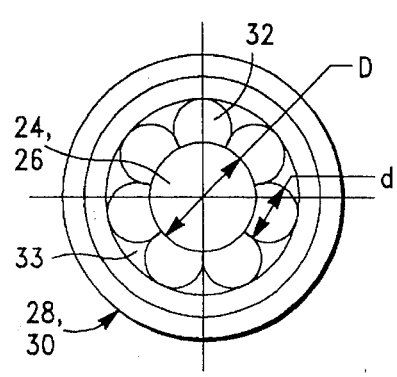
FIG. 6 is an enlarged open-end plan view of a pivot ball bearing assembly of the type included in the FIGS. 2–4 example of the present invention.

FIG. 6 shows a preferred arrangement for the pivot bearing assemblies 28, 30 in relation to the main bearing balls 24, 26. In this example, there are seven small bearing balls 32 located in a cylindrical bearing race 33. The diameter D of the main balls 24 and 26 is approximately twice the diameter d of the small balls 32.

Figure 7:
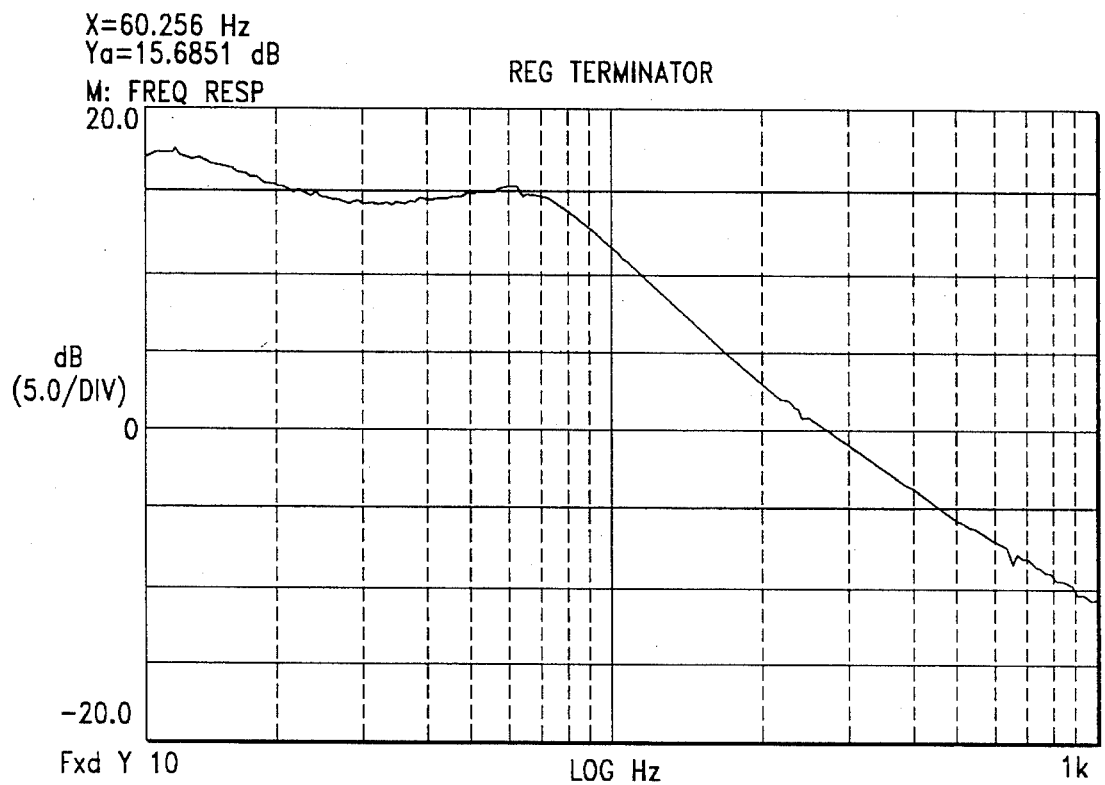
FIG. 7 is a Bode plot of head positioner servo open loop gain of a conventional disk drive 2.5" rotary voice coil actuator having a spindle similar to FIG. 1 and showing a low frequency rolloff at about 60 Hz.
Figure 8:
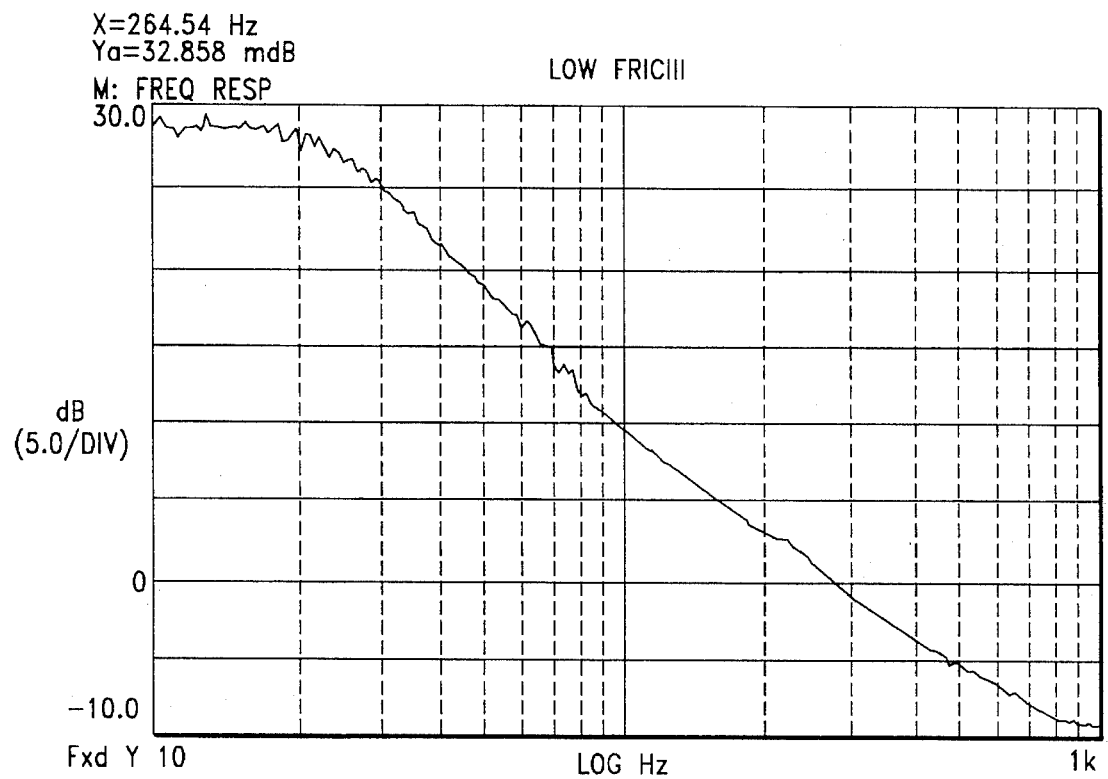
FIG. 8 is a Bode plot of head positioner servo open loop gain of a 2.5" disk drive rotary voice coil actuator having a ball-ball bearing pivot as in the FIGS. 2–4 example of the present invention.

FIGS. 7 and 8 illustrate comparative open loop servo transfer function data collected on a conventional actuator (FIG. 7), and on an actuator incorporating the present invention (FIG. 8). Both actuator designs were of the same overall size. A 2.5 inch diameter disk format was used in making these tests. FIG. 7 shows that as actuator driving currents alternated at 60 Hz and below, open loop gain remained essentially flat. This is because static friction of the conventional actuator required a high actuator current in order to start movement of the actuator. This overdrive condition has led to unacceptable servo dithering in some drives about a desired tracking position.

FIG. 8 shows that open loop servo gain increases until about 20 Hz and is substantially higher at the low frequency end than in the FIG. 7 example. This data suggests that lower driving currents at the low frequency end of the spectrum will be needed for successfully positioning the head actuator structure.

Accordingly, an actuator pivot bearing incorporating the present invention shows improved friction (particularly static friction) characteristics relative to prior art actuator pivot bearings and can also provide a reduction in mass of the rotating actuator body, both of which allow for, inter alia, improved precision in actuator positioning, tracking, and control. Additionally, the present invention provides several simple and cost effective methods for assembling actuator pivot bearings wherein a specified axial preload may be precisely applied and controlled.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A rotary voice coil actuator structure for a micro-Winchester hard disk drive including a base and a rotating data storage disk journalled to the base, the rotary voice coil actuator structure comprising:

a support member fixed to the base and having oppositely facing portions defining a gap therebetween, each of the oppositely facing portions including a bore having a bore diameter, a rotating member having an axis of rotation and occupying at least a portion of the gap and mounted to the oppositely facing portions of the support member, for incrementally rotationally positioning a data transducer head relative to data locations defined on a storage surface of the rotating disk, the axis of rotation of the rotating member being generally coaxial to each bore, and two bearing assemblies, each mounted between an adjacent bore of one of the oppositely facing portions and an adjacent part of the rotating member for facilitating low friction incremental rotation of the rotating member along a limited locus of rotation lying in a plane substantially perpendicular to the axis of rotation of the rotating member, each bearing assembly comprising:

an outer bearing annular race in substantial alignment with the axis of rotation of the rotating member, a ring of equally dimensioned small bearing balls disposed in the outer bearing annular race, a main bearing ball having a diameter in substantial alignment with the axis of rotation of the rotating member and having a diameter larger than the diameters of the equally dimensioned small bearing balls and being in rotational contact therewith and wherein the small bearing balls of each bearing assembly rotate around the main bearing ball, and wherein the outer bearing annular race is mounted to the adjacent part of the rotating member in a plane orthogonal to the axis of rotation and the main bearing ball engages the adjacent bore.

2. The rotary voice coil actuator structure set forth in claim 1 wherein a diameter of a said main bearing ball is approximately two times a diameter of a said small bearing ball.

3. The rotary voice coil actuator structure set forth in claim 1 wherein a locus line between a center of a said main bearing ball and a center of a said small bearing ball in contact with the main ball forms an acute angle with the axis of rotation of the rotating member of greater than 60 degrees and less than 85 degrees.

4. The rotary voice coil actuator structure set forth in claim 3 wherein the angle is approximately 74 degrees.

5. The rotary voice coil actuator structure set forth in claim 1 wherein each oppositely facing portion of the support member defines a ball seat in substantial alignment with the axis of rotation of the rotating member for receiving a said main bearing ball.

6. The rotary voice coil actuator structure set forth in claim 5 wherein the support member comprises a generally U-shaped structure in which said two oppositely facing portions extend outwardly from a main body portion, and wherein the oppositely facing portions define said ball seats as cylindrical bores therethrough in alignment with the axis of rotation of the rotating member.

7. A micro-Winchester disk drive including a base, a rotating storage disk mounted to the base, and a data transducer head incrementally rotationally positioned by a mass balanced rotary voice coil actuator mounted to the base and comprising:

a support structure mounted to the base, a rotatable body having upper and lower bores generally coaxial to an axis of rotation of the rotatable body, an upper pivot bearing assembly defining an upper outer bearing race fixed to the support structure and including a plurality of equally dimensioned small bearing balls in the upper outer bearing race, a lower pivot bearing assembly defining a lower outer bearing race fixed to the support structure and including a plurality of equally dimensioned small bearing balls in the lower outer bearing race, an upper main ball bearing having a diameter greater than a diameter of the upper bore and in substantial alignment with the axis of rotation of the rotatable body and being positioned partially within the upper bore and in contact between the rotatable body and the plurality of small bearing balls of the upper pivot bearing assembly, a lower main bearing ball having a diameter greater than a diameter of the lower bore and in substantial alignment with the axis of rotation of the rotatable body and being positioned partially within the lower bore and in contact between the rotatable body and the plurality of small bearing balls of the lower pivot bearing assembly, and wherein the upper main bearing ball and the lower main bearing ball each have a diameter which is greater than a diameter of each of the equally dimensioned small bearing balls respectively of the upper pivot bearing assembly and the lower pivot bearing assembly and wherein the small bearing balls of each bearing assembly rotate around the main bearing ball in contact therewith.

8. The micro-Winchester disk drive set forth in claim 7 wherein the diameters of each of the upper main bearing ball and the lower main bearing ball are approximately twice the diameter of each of the small bearing balls respectively of the upper pivot bearing assembly and the lower pivot bearing assembly.

9. The micro-Winchester disk drive set forth in claim 7 wherein a locus line between a center of a said main bearing ball and a center of a said small bearing ball in contact with the main ball forms an acute angle with the axis of rotation of the rotatable body of greater than 60 degrees and less than 85 degrees.

10. The micro-Winchester disk drive set fort in claim 9 wherein the angle is approximately 74 degrees.

11. A micro-Winchester disk drive including a base, a rotating storage disk mounted to the base, and a data transducer head incrementally rotationally positioned by a mass balanced rotary voice coil actuator mounted to the base and comprising:

a rotatable body having an axis of rotation, a support structure mounted to the base for supporting said rotatable body, the support structure including an upper bore positioned above the rotatable body and a lower bore positioned below the rotatable body, the upper and lower bores being generally coaxial to the axis of rotation, an upper pivot bearing assembly defining an upper outer bearing race fixed to the rotatable body and including a plurality of equally dimensioned small bearing balls in the upper outer bearing race, a lower pivot bearing assembly defining a lower outer bearing race fixed to the rotatable body and including a plurality of equally dimensioned small bearing balls in the lower outer bearing race, an upper main ball bearing having a diameter greater than a diameter of the upper bore and in substantial alignment with the axis of rotation of the rotatable body and being positioned partially within the upper bore and in contact between the support structure and the plurality of small bearing balls of the upper pivot bearing assembly, a lower main bearing ball having a diameter greater than a diameter of the lower bore and in substantial alignment with the axis of rotation of the rotatable body and being positioned partially within the lower bore and in contact between the support structure and the plurality of small bearing balls of the lower pivot bearing assembly, and wherein the upper main bearing ball and the lower main bearing ball each have a diameter which is greater than a diameter of each of the equally dimensioned small bearing balls respectively of the upper pivot bearing assembly and the lower pivot bearing assembly and wherein the small bearing balls of each bearing assembly rotate around the main bearing ball in contact therewith.

12. The micro-Winchester disk drive set forth in claim 11 wherein the diameters of each of the upper main bearing ball and the lower main bearing ball are approximately twice the diameter of each of the small bearing balls respectively of the upper pivot bearing assembly and the lower pivot bearing assembly.

13. The micro-Winchester disk drive set forth in claim 11 wherein a locus line between a center of a said main bearing ball and a center of a said small bearing ball in contact with the main ball forms an acute angle with the axis of rotation of the rotatable body of greater than 60 degrees and less than 85 degrees.

14. The micro-Winchester disk drive set fort in claim 13 wherein the angle is approximately 74 degrees.

15. A low stiction, shaftless actuator bearing for a rotary actuator assembly comprising:

a rotatable actuator E-block body having an axis of rotation and having a head mounting arm with a long axis and having a transverse bore orthogonal to said long axis, said transverse bore having a bore diameter and having a central axis coincident with said axis of rotation and defining an upper and lower E-block bearing recess, an upper main bearing ball for engaging said upper E-block bearing recess, said upper main bearing ball having a diameter greater than said bore diameter, a lower main bearing ball for engaging said lower E-block bearing recess, said lower main bearing ball having a diameter greater than said bore diameter, an upper pivot bearing assembly having an upper ring of ball bearings, each ball bearing of said upper ring of ball bearings having a diameter less than the diameter of said upper main bearing ball, said upper ring of ball bearings configured in contact with a hemisphere of said upper main bearing ball opposite said upper E-block bearing recess, said upper ring of ball bearings lying in a plane orthogonal to said axis of rotation and having a center coincident with said axis of rotation, said upper pivot bearing assembly further including an upper bearing race for engaging said upper ring of ball bearings, a lower pivot bearing assembly having a lower ring of ball bearings, each ball bearing of said lower ring of ball bearings having a diameter less than the diameter of said lower main bearing ball, said lower ring of ball bearings configured in contact with a hemisphere of said lower main bearing ball opposite said lower E-block bearing recess, said lower ring of ball bearings lying in a plane orthogonal to said axis of rotation and having a center coincident with said axis of rotation, said lower pivot bearing assembly further including a lower bearing race for engaging said lower ring of ball bearings, and support means for supporting said upper pivot bearing assembly and said lower pivot bearing assembly adjacent said upper main bearing ball and said lower main bearing ball, respectively, said support means thereby rotatably supporting said E-block body for rotation about said axis of rotation.

16. The actuator bearing of claim 15, wherein said E-block body comprises a single, unitary component.

17. The actuator bearing of claim 15, wherein said support means includes preload spring means for applying a preload force to either said upper bearing assembly or said lower bearing assembly along said axis of rotation.

* * * * *